United States Patent
Rozario et al.

(10) Patent No.: US 10,649,773 B2
(45) Date of Patent: May 12, 2020

(54) PROCESSORS SUPPORTING ATOMIC WRITES TO MULTIWORD MEMORY LOCATIONS AND METHODS

(71) Applicant: MIPS Tech, LLC, Santa Clara, CA (US)

(72) Inventors: Ranjit J. Rozario, San Jose, CA (US); Andrew F. Glew, Santa Clara, CA (US); Sanjay Patel, Santa Clara, CA (US); James Robinson, Santa Clara, CA (US); Sudhakar Ranganathan, Santa Clara, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 245 days.

(21) Appl. No.: 15/092,915

(22) Filed: Apr. 7, 2016

(65) Prior Publication Data

US 2017/0293486 A1   Oct. 12, 2017

(51) Int. Cl.
*G06F 9/30* (2018.01)
*G06F 9/38* (2018.01)
*G06F 12/0875* (2016.01)
*G06F 12/0897* (2016.01)
(Continued)

(52) U.S. Cl.
CPC ........ *G06F 9/30043* (2013.01); *G06F 9/3001* (2013.01); *G06F 9/3004* (2013.01); *G06F 9/30087* (2013.01); *G06F 9/3834* (2013.01); *G06F 12/0875* (2013.01);
(Continued)

(58) Field of Classification Search
CPC ............. G06F 9/30043; G06F 12/0875; G06F 12/0897; G06F 9/30087; G06F 9/3834
See application file for complete search history.

(56) References Cited

U.S. PATENT DOCUMENTS 5,742,785 A * 4/1998 Stone .................... G06F 9/3004
709/213
2003/0191928 A1* 10/2003 Sheaffer .............. G06F 9/30061
712/236
(Continued)

OTHER PUBLICATIONS

ARM11 MPCore Processor, 2008, ARM, r2p0, 8 pages, [retrieved from the internet on Dec. 20, 2017], retrieved from URL <infocenter.arm.com/help/topic/com.arm.doc.ddi0360f/DDI3360F_arm11_mpcore_r2p0_trm.pdf>.*
(Continued)

*Primary Examiner* — Jyoti Mehta
(74) *Attorney, Agent, or Firm* — Adams Intellex, PLC

(57) ABSTRACT

A system and method process atomic instructions. A processor system includes a load store unit (LSU), first and second registers, a memory interface, and a main memory. In response to a load link (LL) instruction, the LSU loads first data from memory into the first register and sets an LL bit (LLBIT) to indicate a sequence of atomic instructions is being executed. The LSU further loads second data from memory into the second register in response to a load (LD) instruction. The LSU places a value of the second register into the memory interface in response to a store conditional coupled (SCX) instruction. When the LLBIT is set and in response to a store (SC) instruction, the LSU places a value of the second register into the memory interface and commits the first and second register values in the memory interface into the main memory when the LLBIT is set.

12 Claims, 4 Drawing Sheets

| Word 0 | Word 1 | Word 2 | Word 3 | Word 4 | Word 5 | Word 6 | Word 7 |

(51) Int. Cl.
*G06F 12/0817* (2016.01)
*G06F 12/0811* (2016.01)

(52) U.S. Cl.
CPC ...... G06F 12/0897 (2013.01); *G06F 12/0811* (2013.01); *G06F 12/0817* (2013.01); *G06F 2212/452* (2013.01)

(56) References Cited

U.S. PATENT DOCUMENTS

2009/0172364 A1* 7/2009 Sprangle ............ G06F 9/30043
712/225
2014/0215157 A1* 7/2014 Moir .................. G06F 12/0811
711/122

OTHER PUBLICATIONS

Load and store, Dec. 3, 2005, 3 pages, [retrieved from the internet on Dec. 14, 2017], retrieved from URL <www.cs.umd.edu/class/sum2003/cmsc311/Notes/Mips/load.html>.*

Writing into cache, Mar. 27, 2014, 6 pages, [retrieved from the internet on Dec. 23, 2017], retrieved from URL <homepage.divms.uiowa.edu/~ghosh/4-6-10.pdf>.*

Alu, Sep. 28, 2011, Techterms.com, 2 pages, [retrived from the internet on Dec. 24, 2017], retrieved from URL <techterms.com/definition/alu>.*

* cited by examiner

PROCESSORS SUPPORTING ATOMIC WRITES TO MULTIWORD MEMORY LOCATIONS AND METHODS

FIELD OF THE INVENTION

Various configurations of the current invention relate generally to an apparatus, systems, and methods for how processors access memory. More particularly, the apparatus, systems, and methods relate to how multithreaded processors access memory. Specifically, the apparatus, systems, and methods provide for accessing memory with atomic operations that are wider than a "machine size" of the processor(s) in the processor system.

BACKGROUND OF THE INVENTION

An atomic operation is an operation that appears as a single change to the "external" state (i.e., external to the parts of the processor that are performing the transaction) of a processor. For example, an atomic operation can include (1) reading a value from memory, (2) changing that value, and (3) writing the changed value back to memory. If these three steps are part of an atomic operation, they all must be performed; otherwise, none of these steps are performed. Atomic operations may ensure that a memory location that was read is locked from being modified by another thread. These types of features are important for memory locations that are writable and shared among multiple threads.

Prior art systems locked a memory location using a Load Link (LL) instruction (also known as a Load Lock or Locked Load) to a particular memory address. The LL instruction (1) causes loading of the data at the memory address into a register and (2) sets a link status bit (LLBIT). Later, a Store Conditional (SC) instruction is executed, which first checks the LLBIT status, and if LLBIT remains set, then the SC instruction continues and will commit the updated value into memory. If the LLBIT was cleared, then the SC instruction will fail, and the atomic operation, starting at the LL instruction, will repeat. In a multiprocessor system, if a cache line holding data that the LL instruction is loaded from is subsequently written or has another processor invalidating that line, then the SC instruction will fail. In a multiprocessor system, if some other processor or agent modifies the location protected by the LL bit, the LL bit will be cleared. What is needed is a better way to access memory.

SUMMARY OF THE INVENTION

In one configuration, a processor system processes atomic instructions. The processor system includes a load store unit (LSU), first and second registers, a memory interface, and a main memory. In response to a load link (LL) instruction, the LSU loads first data from memory into the first register and sets an LL bit (LLBIT) to indicate a sequence of atomic operations is being executed and, also, loads a register that remembers the address of the LL instruction. The LSU further loads second data from memory into the second register in response to a load (LD) instruction. In other configurations, those of ordinary skill in the art will appreciate that other instructions than a load (LL) instruction may cause the LLBIT to be set to indicate a set of atomic operations is to be performed. The LSU may place a modified value of the second register into the memory interface in response to a store conditional extended (SCX) instruction. When the LLBIT is set and in response to a store (SC) instruction, the LSU places a value of the first register into the memory interface and only commits the first and second register values in the memory interface into the main memory when the LLBIT is set.

Another configuration is a method of using atomic instructions to commit to memory data of two or more registers. Of course the data may be sized different than a register and may be larger or smaller than a word as described in this example method. The method begins by executing an LL instruction that reads/loads a low word of data from a memory location and also sets a corresponding LLBIT of at least a partial block of data stored at this memory location to indicate that the read from this memory location is part of an atomic operation. A load word (LW) instruction loads a high word of data from another memory location. Each of these two words are operated on by one or more instructions to change one or both of the values of the low word and/or high word. The method executes an SCX instruction to write the modified high word back to a memory interface but will not commit data in the memory interface to memory. If the LLBIT is still set, the method then executes an SC instruction and writes the low word to the memory interface and will also commit the low word and the high word in the memory interface to memory only if the LLBIT is set. If the LLBIT is not set when the SC instruction is executed, then the low word and the high word in the memory interface will not be committed to memory and the method will re-execute the atomic operation again, beginning at the LL instruction. In some configurations, the SC instruction must be the very next instruction right after the SCX instruction because if it is not, then this example of atomic operations will need to begin again with the beginning LL instruction.

In another configuration, a multithreaded processor system supports atomic operations for memory locations that are wider than a "machine size" of the processor(s) in the processor system. For example, a processor system may have a 32-bit machine size, and thus have 32-bit wide registers, but can support an atomic Read Modify Write (RMW) operation for 64 bits of memory. In one example, the processors in the processor system support this capability by being able to execute an instruction conditional write to one part of the 64-bit memory which is coupled with another conditional write to another part of the 64-bit memory. The coupled writes either succeed or fail together. In some implementations, the coupled writes are conditioned on a status bit that is first set by a linked load instruction that starts an atomic operation. The status bit identifies a block of memory. If the status bit remains set when the final conditional write is ready to be performed, then all of the other coupled writes that are coupled to that final write also can be committed. If another process or thread attempts to modify an address in the block of memory, then the status bit is cleared, the final conditional write would fail, and all conditional writes coupled to that final conditional write would also fail.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Some processor architectures are designed to support instructions that transfer data to/from memory, or perform operations on values in registers, but do not support instructions that perform operations on data resident in memory (i.e., instructions that perform operations have only register sources and register destinations, and loads/stores either put data into registers or store data in memory from registers. These architectures are generally called "load/store" or "register-register"; many Reduced Instruction Set Complexity (RISC) architectures have these characteristics.

As mentioned above, an approach to implementing atomic memory operations is to provide instructions to implement a software construct that initiates an atomic operation with a Load Link (LL) instruction to a particular memory address. In general, LL instructions perform two primary actions (1) load data at a memory address into a register and (2) set a corresponding link status bit (LLBIT). Setting the LLBIT indicates that the memory address within a block of memory has been accessed for the purpose of performing an atomic operation. As discussed again below, those of ordinary skill in the art will appreciate, that in other configurations, that instructions other than a load (LL) instruction may cause the LLBIT to be set to indicate a sequence atomic operations is to be performed. In some cases, a link address register is also set in order to identify the addresses in the block of memory in memory to which the LLBIT relates. Thus, some configurations may have multiple LLBITs allowing multiple atomic memory operations to different blocks of memory to be in progress concurrently.

Figure 1:
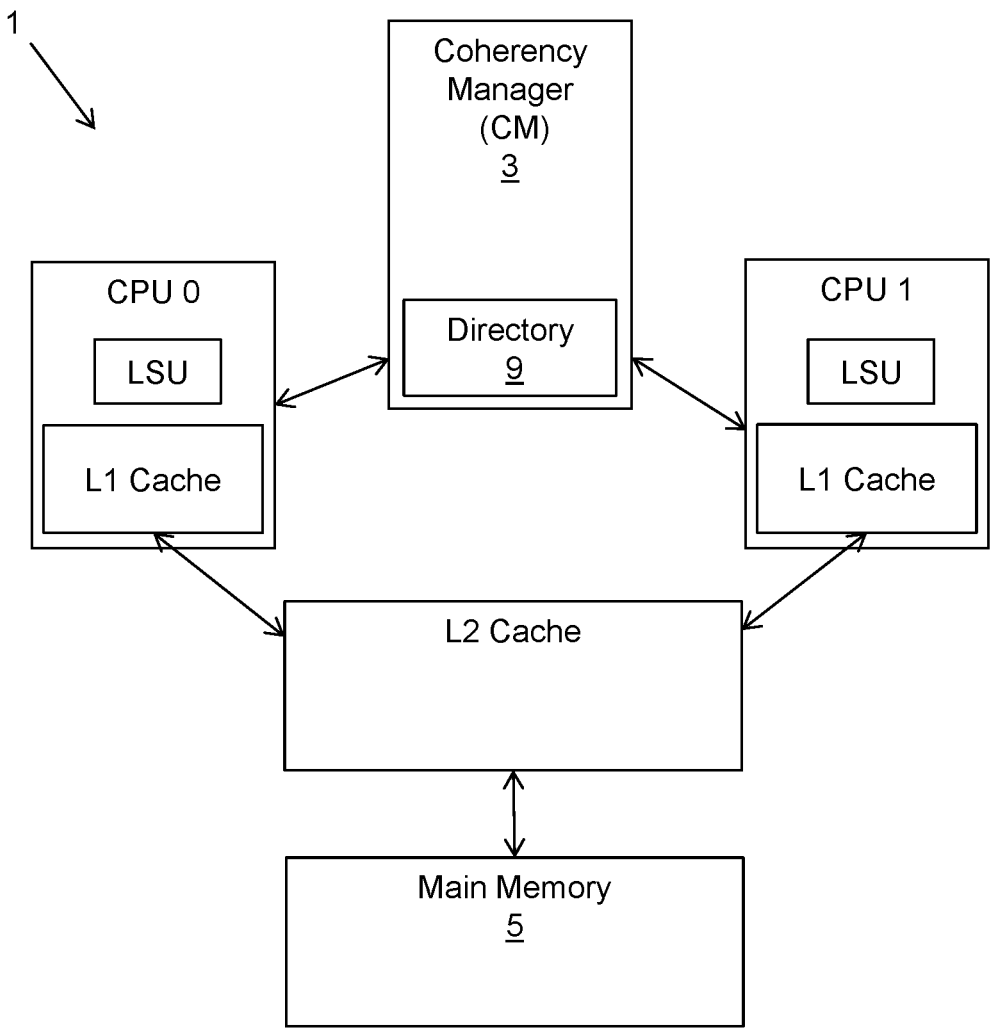
FIG. 1 illustrates one example multi-processor system that executes atomic operations storing at least two memory elements to memory.

As illustrated in FIG. 1, a system 1 contains a coherency manager (CM) 3 that has a directory 9, the CM 3 maintaining coherency of one or more of L2 and L1 caches that are being accessed by CPU 0 and CPU 1. System 1 further includes a memory 5 that may be part of a memory hierarchy. Those of ordinary skill in the art will appreciate that a different number of CPUs may be used than what is illustrated in FIG. 1, and the memory system of FIG. 1 may have other components and/or configurations. CM 3 maintains memory coherence by observing accesses that are made to memory addresses (e.g., snoops) of cache lines. CM 3 monitors if there is a write access to a memory location within the block of memory to which a set LLBIT pertains and resets that LLBIT if there is an access to that block of memory. Subsequently, the operations that were intended to be atomic with the load instructions and a later store instruction will complete to create an updated value that will be ready to be written back to the memory 5. At that time, a Store Conditional (SC) instruction is executed, which first checks the status of the corresponding LLBIT, and if the LLBIT remains set, then the SC instruction can continue and the updated value is committed for memory storage. If the LLBIT was cleared, then the SC instruction will fail, and the atomic operations, starting at the LL instruction, will repeat (e.g., replay). Those of ordinary skill in the art will appreciate that these instructions may be caused to repeat by hardware and/or software. This prior art approach to achieving atomic memory operations may be called "Load Link/Store Conditional" (LL/SC).

The following gives an example pseudo code snippet that can be used to atomically update a counter value in memory:

```
LL Rd, Rs, Imm
Increment Rd
SC Rd, Rs, Imm
```

As indicated, a Load Link instruction first loads a word to a destination register (Rd) from an effective address based on the value in a source register (Rs) and an immediate offset value (Imm) encoded in the instruction (LLADDR=$Rs+Imm). This instruction also sets an LLBIT associated to this address to a set value (e.g., a value of one (1)). Next, the value of the destination register (Rd) is incremented. Later, a Store Conditional (SC) instruction stores the modified value of Rd to memory at the effective address based on the value in Rs and the immediate offset value (EFFADDR=$Rs+Imm).

The above approach works fine for atomic operations that operate only on data that is the same as the machine size (i.e., a width of the general purpose registers of the CPU or more generally the width of the registers that are being atomically addressed). For example, in a MIPs 32-bit processor, the atomic instructions would be 32-bit instructions, and in a MIPs 64-bit processor, the atomic instructions would be 64-bit instructions. In general, a basic load instruction would load an amount of data from memory equal to the machine size into a specified register. There can be instructions that also load portions of a register, such as a load byte instruction. The sizes of the ports to the register file are tuned to the width of the registers.

If it was desired to perform atomic operations in values that were greater than a machine size (e.g., in a 32-bit machine, operating atomically on a 64-bit value, or on a 128-bit value in a 64-bit machine), then one option may be to add a larger port to the register file, so that more than one Load Link instruction may be performed at once allowing two Load Link instructions to execute in sequence (e.g., LL(Addr A) LL(Addr A+4)). This sequence could set different LLBITs that may be monitored by CM 3. However, when it is time to commit the value, there would either need to be a wider port or an extra port to the register file, because one half of the store transaction may be written, but not followed, by the other store instruction. This would pose an atomicity problem as there may be an interrupt between the separate store instructions, such that one half of the value could be stored before the interrupt and the other half would not be stored until after the interrupt. It is very expensive in terms of area, power, and timing to add larger ports to a register file; therefore, this solution is not ideal.

To overcome these deficiencies, system 1 of FIG. 1 provides for a Load Link/Store Conditional sequence that provides a Load Link (LL) instruction, a Store Conditional (SC) instruction, and a Store Conditional Extended (SCX) instruction. The LSU of CPU 0 processes the SCX and SC instructions so that they each separately write data using an existing write port to the L1 cache. However, the data of the L1 cache line is not committed to memory until the data of both the SCX and SC instructions are both in the L1 cache line and both guaranteed to be committed to memory at the same time. Committing the data of the SCX and SC instruction via a same memory interface at the same time solves the issues of an interrupt or other action from causing these instructions to be committed to memory at different times. Notice that this approach does not require any additional read or write ports to be added to a processor executing atomic instructions.

The SCX instruction can be used in a 32-bit processor example implementation of the flowing group of atomic instructions:

| LL  | low word      |
|-----|---------------|
| LW  | high word     |
| ADD | low word, 1   |
| ADD | high word, 1  |
| SCX | high word     |
| SC  | Low word      |

Figure 2:
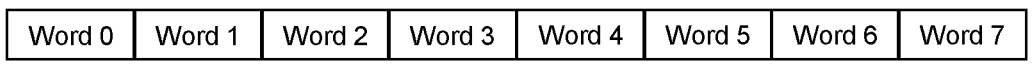
FIG. 2 illustrates an example ordering of words within a cache line.

For example, CPU 0 of FIG. 1 may be a 32-bit processor executing these instructions. FIG. 2 illustrates one example cache line of the L1 cache of CPU 0 that has eight words. The LSU of CPU 0 will execute the first instruction, LL, that may read/load a low word of data from the fifth word (word 4) of the cache line of FIG. 2 located in CPU 0 into a register internal to CPU 0 and set a corresponding LLBIT of at least a partial block of data stored in this cache line. For ease of explanation, this specification and the figures describe an LL instruction as causing the LLBIT to be set; however, those of ordinary skill in the art will appreciate, that in other configurations, that instructions other than an LL instruction may cause the LLBIT to be set to indicate a sequence atomic operations will be performed. Next, in this example, a load word (LW) instruction loads a high word of data from the sixth word (word 5) of the cache line into another internal register of CPU 0. Each of these words are incremented by one (or changed to other values) by the two following ADD instructions. Next, the SCX instruction will write the incremented high word back to a temporary version of word 5 of the cache line, but will not commit this cache line to memory. In addition, CPU 1 that shares the same cache will not be able to see the temporary data of word 5. Finally, the SC instruction will write the low word back to word 4 of the cache line but only if the LLBIT for this cache line is still set will this cache line also be committed to memory, for example, by writing it into the shared L2 cache. At the same time, the temporary value of word 5 is also committed to memory. In some configurations, the SC instruction must be the very next instruction right after the SCX instruction; if it is not, this example of atomic operations will fail and need to begin again with the beginning LL instruction. If the atomic operation fails, neither of the two write operations are commit to memory and the temporary values are discarded.

Many processors have a memory interface that is some multiple of the width of the processor (e.g., 128 bits for a 32-bit processor). For example, if the memory interface were 128 bits, and the atomic operations were for the lower 64 bits of a 128-bit memory transaction, then the SCX transaction can be for the upper 32 bits of the lower 64 bits of the memory transaction and the SC instruction would be to the lower 32 bits of the lower 64 bits of the memory transaction.

In some configurations, a memory interface may be the same width as a cache line. In other configurations, the memory interface can be a fraction of a cache line. In some implementations, the block at which atomicity is checked is a cache line and the size of blocks at which atomicity may checked is a multiple (greater than one times) the data bus machine size, and in other configurations it may be at least twice the machine size.

In another example, the LL, LW, SCX, and SC instruction can be extended to double word instructions LLD, LD, SCDX, and SCD, respectively. Actually, the LL, LW, SCX, and SC instructions may be extended to instructions operating on any larger or smaller data size. The double word instructions can be used in a 64-bit processor as one example implementation of the following atomic instructions:

| LLD  | low double word            |
|------|----------------------------|
| LD   | high double word           |
| ADD  | low double word value 1,   |
| ADD  | high double word, value 2  |
| SCDX | high double word           |
| SCD  | low double word            |

In this example, CPU 1 of FIG. 1 may be a 64-bit processor executing these instructions. FIG. 2 may also illustrate one example cache line of the L1 cache of CPU 1 that has eight words. The LSU of CPU 1 will execute the first instruction, LLD (load lock double word) that will load a low double word of data from the third and fourth words (words 2, 3) of the cache line into a register internal to CPU 1 and set a corresponding LLBIT of at least a partial block of data stored in this cache line. Next, a load double word (LD) instruction loads a high double word of data from the fifth and sixth words (words 4, 5) of the cache line into another internal register of CPU 1. Next, the ADD instructions adds some values to each of the double words. The SCDX instruction will write the resulting high double word back to the temporary version of the fifth and sixth words (words 4, 5) of the cache line of the L1 cache of CPU 1 but will not commit this cache line to memory. Finally, the SCD instruction will write the low double word back to the third and fourth words (words 2, 3) of the cache line but only if the LLBIT for this cache line is still set will this cache line also be committed to memory, for example, by writing it into L2 cache. At the same time, the temporary values of words 4, 5 will also get committed to memory. In some configurations, the SCD instruction must be the very next instruction right after the SCDX instruction; if it is not, this example of atomic operations will fail and need to begin again with the beginning LDD instruction.

Figure 3:
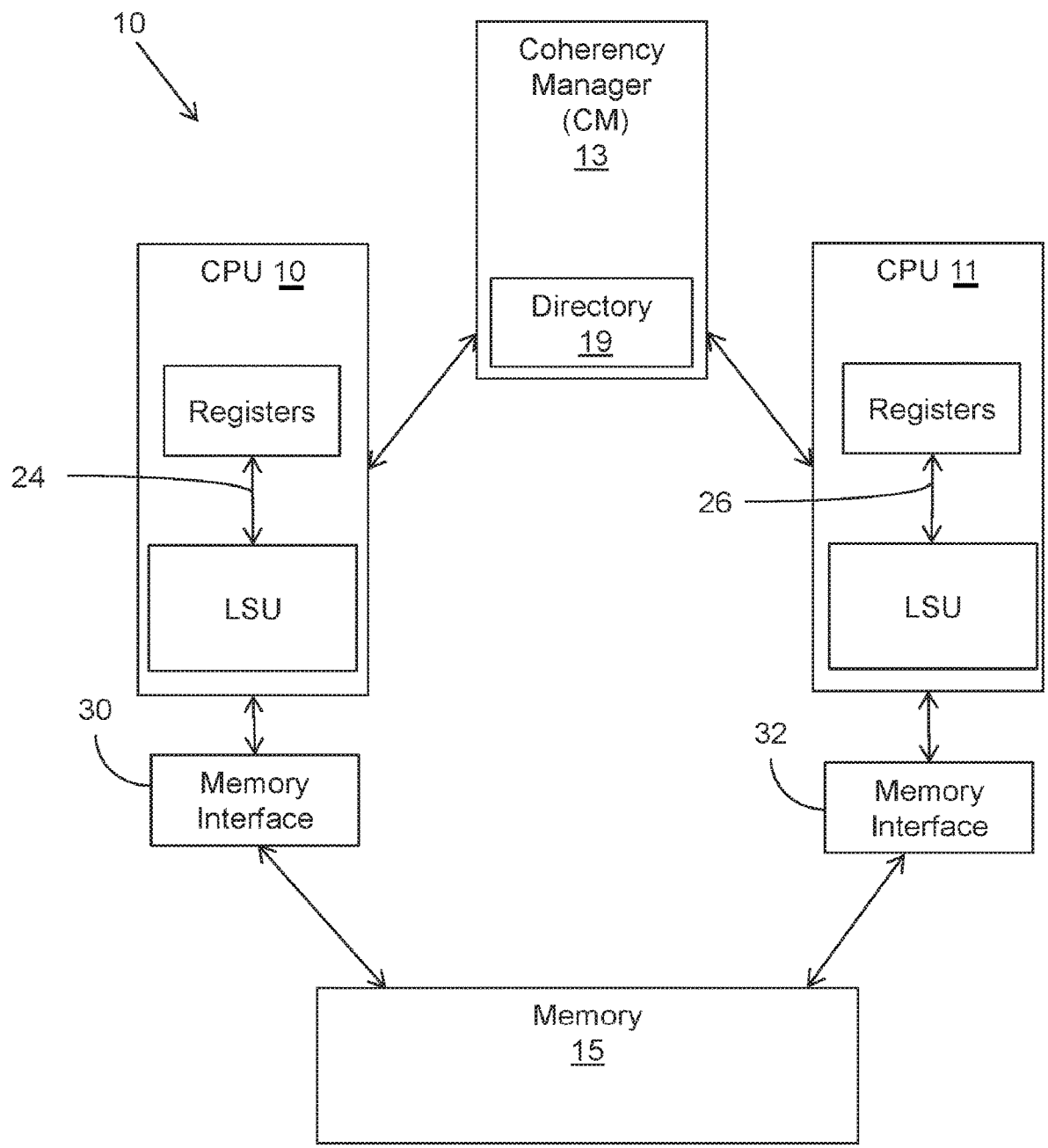
FIG. 3 illustrates another example multi-processor system that executes atomic operations storing at least two memory elements to memory.

FIG. 3 illustrates another configuration of a system 10 that can execute atomic operations where two (or more) store instructions are committed to memory at the same time. Similar to FIG. 1, this figure includes two CPUs 10, 11 that each have a separate memory interface 30, 32. System 10 further includes a coherency manager 13 that has a directory 19 and system 10 also has a memory 15 that may be part of a memory hierarchy that is connected to the memory interfaces 30, 32 of CPU 10 and CPU 11, respectively. CPU 10 and CPU 11 each have registers that have register interfaces 24, 26 to respective load store units where the register interfaces 24, 26 are of a width of the registers of CPU 10 and CPU 11. In this configuration, memory interfaces 30, 32 are of a width that is at least twice of register interfaces 24, 26 or, in general, an integer N multiple of the register interfaces 24, 26 where N is an integer of two (2) or greater. However, those of ordinary skill in the art will understand that memory interfaces 30, 32 may be other sizes in other configurations.

In operation, system 10 of FIG. 3 may execute a sequence of atomic operations. For example, the LSU of CPU 11 may execute an LL instruction to load data from an address of memory 15 into a first register in CPU 11 and set an LLBIT. A second data is then loaded from a second address from memory 15 into a second register of CPU 11. The data in the first and second registers is then manipulated by one or more arithmetic logical unit instructions and replaced into the first and second registers. Next, a SCX instruction is executed to load data from the second register into the memory interface 32 of the CPU 11 but is not set to memory. A subsequent SC instruction is executed to load data from the first register to the memory interface 32 of the CPU 11 and only if the LLBIT is still set CPU 11's LSU will commit data from the memory interface 32 to memory 15. As discussed above, if the LLBIT is no longer set when the SC instruction executes, then these atomic instructions will be discarded and will restart at the initial LL instruction.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
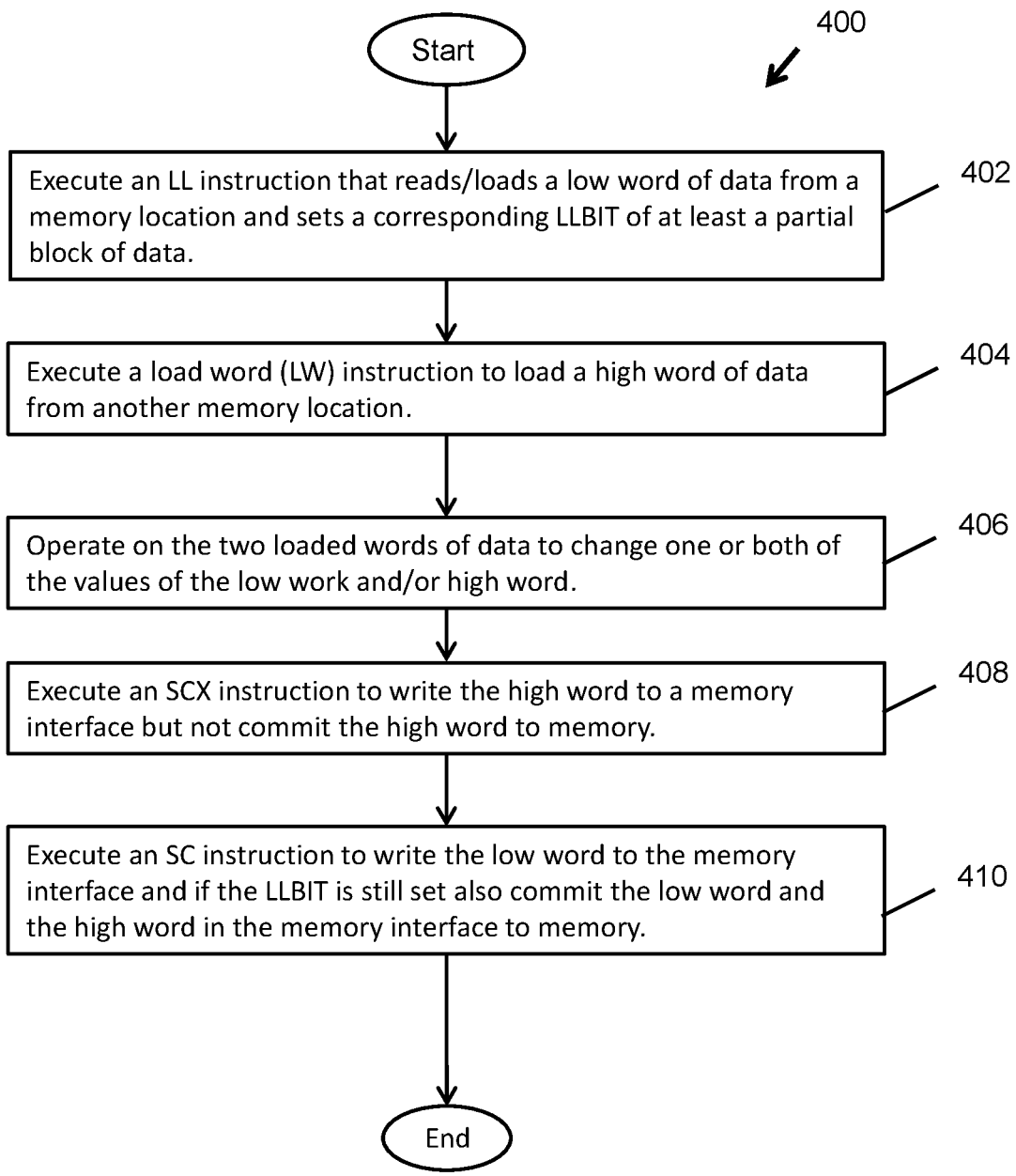
FIG. 4 illustrates another example method that executes atomic operations.

FIG. 4 illustrates a method 400 of using atomic operations to commit to memory data of two or more registers. Of course the data may be sized differently than a register size and may be larger or smaller than a word size as described in example method 400. Method 400 begins by executing an LL instruction that reads/loads a low word of data from a memory location and also sets a corresponding LLBIT of at least a partial block of data stored at this memory location at 402 to indicate that the read from this memory location is part of an atomic operation. At 404, a load word (LW) instruction loads a high word of data from another memory location. Each of these two words are operated on at 406 by one or more instructions to change one or both of the values of the low word and/or high word. Next, method 400 executes an SCX instruction at 408 to write the modified high word back to a memory interface but will not commit data in the memory interface to memory. Method 400 then executes an SC instruction at 410 to write the low word to the memory interface and if the LLBIT of a block of memory associated with the low word and high word is still set method 400 will also commit the low word and the high word in the memory interface to memory. If the LLBIT is not set when the SC instruction is executed, then the low word and the high word in the memory interface will not be committed to memory and method 400 will re-execute the atomic operations again beginning at the LL instruction. In some configurations, the SC instruction must be the very next instruction right after the SCX instruction; if it is not, this example of atomic operations will need to begin again with the beginning LL instruction.

Figures 5A, 5B:
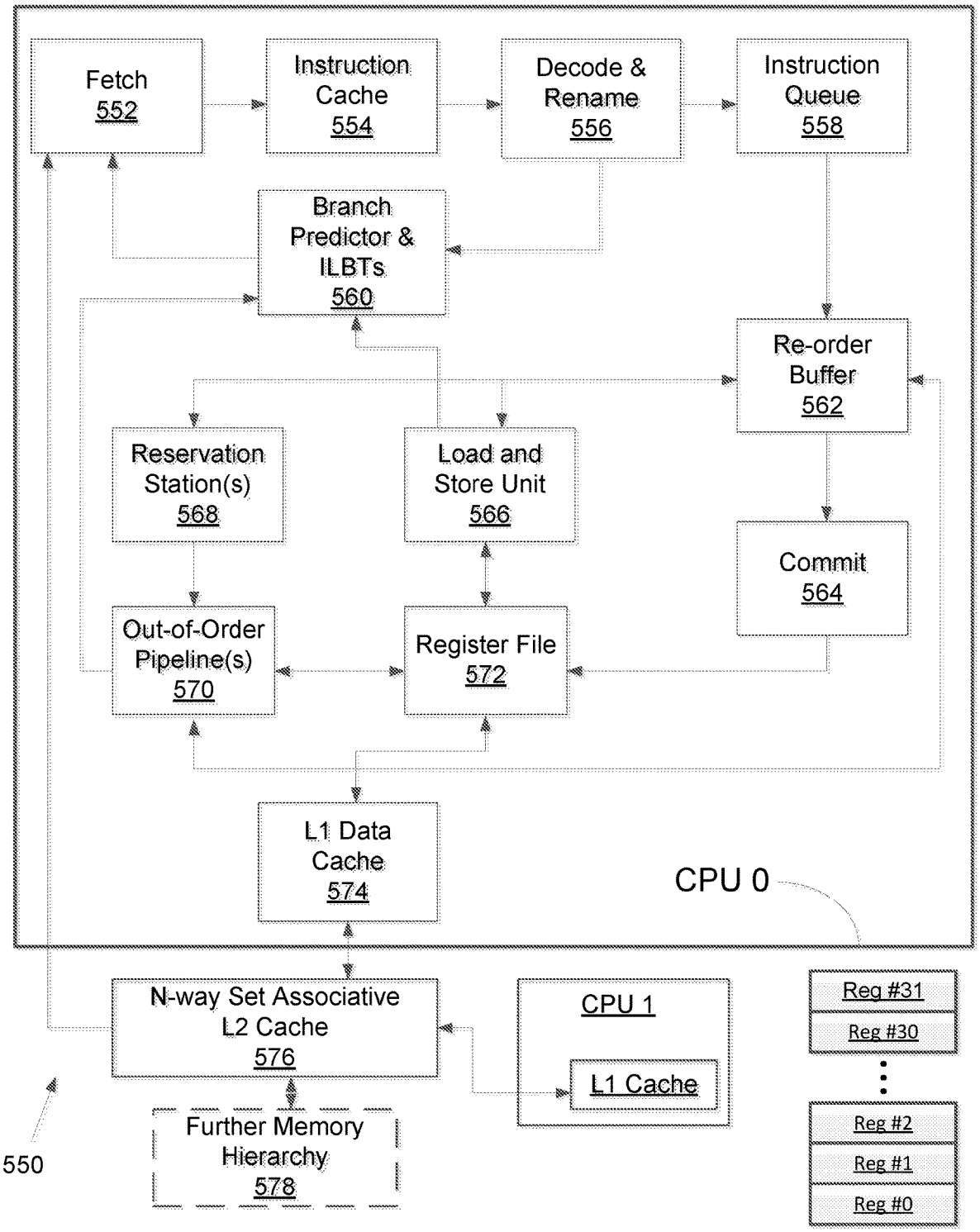
FIGS. 5A and 5B illustrate an example multi-processor system in which atomic operations may be executed that may store two memory elements to memory.

FIGS. 5A and 5B present an example block diagram of a multi-processor system 550 that can implement the disclosure. In particular, the load store unit (LSU) 566 can execute load and store instructions in accordance with the disclosure to in part ensure memory coherency between load and store instructions. For example, LSU 566 of CPU 0 may execute a LL instruction that may load a low word and that sets an LLBIT indicating a sequence of atomic operations is being executed. In addition, the address of the atomic operation may be saved to some internal state. This address may help determine if some other store from any of the processors in the system should clear this LL bit. The LL instruction may be followed by a normal LD instruction that loads a high word. Later an SCX instruction followed by an SC instruction will respectively write the modified high and low words to a memory interface but will not commits these words to memory unless the LLBIT is still set.

The fetch logic 552 pre-fetches software instructions from memory that the processor 550 will execute. These prefetched instructions are placed in an instruction cache 554. These instructions are later removed from the instruction cache 554 by the decode and rename logic 556 and decoded into instructions that the processor can process. These instructions are also renamed and placed in the instruction queue 558. The decoder and rename logic 556 also provides information associated with branch instructions to the branch predictor and Instruction Translation Lookaside Buffers (ITLBs) 560. The branch predictor and ILTBs 560 predict branches and provide this branch prediction information to the fetch logic 552 so instructions of predicted branches are fetched.

A re-order buffer 562 stores results of speculatively completed instructions that may not be ready to retire in programing order. The re-order buffer 562 may also be used to unroll miss-predicted branches. The reservation station(s) 568 provide(s) a location to which instructions can write their results without requiring a register to become available. The reservation station(s) 568 also provide for register renaming and dynamic instruction rescheduling. The commit unit 564 determines when instruction data values are ready to be committed/loaded into one or more registers in the register file 572. The load and store unit 566 monitors load and store instructions to be sure accesses to and from memory follows sequential program order, even though the processor 550 is speculatively executing instructions out of order. For example, the load and store unit 566 will not allow a load instruction to load data from a memory location that a pending older store instruction has not yet written.

Instructions are executed in one or more out-of-order pipeline(s) 570 that are not required to execute instructions in programming order. In general, instructions eventually write their results to the register file 572. FIG. 5B illustrates an example register file with 32 registers Reg #0 through Reg #31. Depending on the instruction, data results from the register file 572 may eventually be written into one or more level one (L1) data cache(s) 574 and an N-way set associative level two (L2) cache 576 before reaching a memory hierarchy 578.

Modern general purpose processors regularly require in excess of two billion transistors to be implemented, while graphics processing units may have in excess of five billion transistors. Such transistor counts are likely to increase.

Such processors have used these transistors to implement increasingly complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

For example, high-level features, such as what instructions a processor supports conveys architectural-level detail. When describing high-level technology, such as a programming model, such a level of abstraction is appropriate. Microarchitecture detail describes high-level detail concerning an implementation of architecture (even as the same microarchitecture may be able to execute different ISAs). Yet, microarchitecture detail typically describes different functional units and their interrelationship, such as how and when data moves among these different functional units. As such, referencing these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units and abstract those while addressing in more detail the relevant part of that functional unit.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high-level logical description of the logic to be implemented (e.g., a "hardware description language").

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the function or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature, may be described. For example, a "decode unit" refers to circuitry implementing decoding of processor instructions. The description explicates that in some aspects such decode unit, and hence circuitry implementing such decode unit, supports decoding of specified instruction types. Decoding of instructions differs across different architectures and microarchitectures, and the term makes no exclusion thereof, except for the explicit requirements of the claims. For example, different microarchitectures may implement instruction decoding and instruction scheduling somewhat differently, in accordance with design goals of that implementation. Similarly, there are situations in which structures have taken their names from the functions that they perform. For example, a "decoder" of program instructions that behaves in a prescribed manner, describes structure supporting that behavior. In some cases, the structure may have permanent physical differences or adaptations from decoders that do not support such behavior. However, such structure also may be produced by a temporary adaptation or configuration, such as one caused under program control, microcode, or other source of configuration.

Different approaches to design of circuitry exist. For example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly by circuitry that primarily relies on a transistor implemented in a semiconductor as a primary switch element, this term is to be understood in relation to the technology being disclosed. For example, different physical processes may be used in circuitry-implementing aspects of the disclosure, such as optical, nanotubes, microelectrical mechanical elements, quantum switches or memory storage, magneto resistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry where such circuitry may be a fixed function, configurable under program control or under other configuration information, or some combination thereof. Functional modules themselves thus may be described by the functions that they perform to helpfully abstract how some of the constituent portions of such functions may be implemented.

In some situations, circuitry and functional modules may be described partially in functional terms and partially in structural terms. In some situations, the structural portion of such a description may be described in terms of a configuration applied to circuitry or to functional modules, or both.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a byproduct or concurrently with performance of another act or process, or may be performed as multiple, separate acts in some implementations. As such, implementations according to this disclosure are not limited to those that have a 1:1 correspondence to the examples depicted and/or described.

Above, various examples of computing hardware and/or software programming were explained, as well as examples of how such hardware/software can intercommunicate. These examples of hardware or hardware configured with software and such communication interfaces provide means for accomplishing the functions attributed to each of them. For example, a means for performing implementations of software processes described herein includes machine-executable code used to configure a machine to perform such process. Some aspects of the disclosure pertain to processes carried out by limited configurability or fixed-function circuits and in such situations, means for performing such processes include one or more of special purpose and limited-programmability hardware. Such hardware can be controlled or invoked by software executing on a general purpose computer.

Implementations of the disclosure may be provided for use in embedded systems, such as televisions, appliances, vehicles, personal computers, desktop computers, laptop computers, message processors, hand-held devices, multi-processor systems, microprocessor-based or programmable consumer electronics, game consoles, network PCs, mini-computers, mainframe computers, mobile telephones, PDAs, tablets, and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer-readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL), and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL), that can be used to produce a specific integrated circuit implementation. A computer-readable medium may embody or store such description language data, and thus constitute an article of manufacture. A non-transitory machine readable medium is an example of computer-readable media. Examples of other embodiments include computer-readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases, terminology has been used herein because it is considered to more reasonably convey salient points to a person of ordinary skill, but such terminology should not be considered to imply a limit as to a range of implementations encompassed by disclosed examples and other aspects. A number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A processor system comprising:
a load store unit (LSU) configured to execute load and store instructions;
a first register;
a second register;
a memory interface;
wherein the LSU is configured to, in response to processing an instruction, set a link load bit (LLBIT) to indicate that atomic operations are to be executed;
wherein the LSU is configured to place a value of the second register into the memory interface in response to a store conditional coupled (SCX) instruction, and wherein the LSU is configured to place a value of the first register into the memory interface in response to a store (SC) instruction; and a main memory, and wherein the LSU will only commit the first and second register values in the memory interface into the main memory when the LLBIT is set when the SC instruction is executed, wherein the SC instruction is only executed if the LLBIT is still set.

2. The processor system of claim 1 wherein the LSU is configured to load first data from the main memory through the memory interface into the first register in response to a load link (LL) instruction and to set the LLBIT in response to the LL instruction, wherein the LSU is further configured to load second data from the main memory through the memory interface into the second register in response to a load (LD) instruction, and where the value of the second register is a different value than the second data before the value of the second register is placed into the memory interface in response to the SCX instruction.

3. The processor system of claim 2 further comprising:
an arithmetic logical unit (ALU) configured to execute an ALU instruction operating on the value of the second register to create the different value than the second data.

4. The processor system of claim 1 wherein the LSU will not commit the first and second register values in the memory interface into the main memory when the LLBIT is not set, and wherein the processor system is configured to replay the atomic operations when the LLBIT is not set.

5. The processor system of claim 1 further comprising:
a level two (L2) cache shared between two or more processors.

6. The processor system of claim 1 wherein the SC instruction is executed immediately after the SCX instruction.

7. The processor system of claim 1 wherein the LSU is configured to clear the LLBIT in response to determining that no SC instruction immediately follows the SCX instruction.

8. The processor system of claim 1 wherein the first register and the second register are both 32-bit registers.

9. A method of executing atomic instructions in a multi-threaded system comprising:
executing a load link (LL) instruction to load a first data value from a memory block and set a corresponding LLBIT to indicate that a read from this memory block is part of a sequence of atomic instructions;
executing a load word (LW) instruction to load a second data value from another location in the memory block;
executing a store conditional coupled (SCX) instruction to write the second data value back to a memory interface but not committing data in the memory interface to the memory block; and
only if the LLBIT is still set, executing a store conditional (SC) instruction to write the first data value to the memory interface and if the LLBIT is still set committing the first data value and the second data value in the memory interface to the memory block.

10. The method of claim 9 further comprising:
changing value of the first data value before the first data value is written to the memory interface.

11. The method of claim 9 further comprising:
executing the SCX and the SC instructions back-to-back.

12. The method of claim 9 further comprising:
resetting the LLBIT when an instruction immediately following the SCX instruction is not the SC instruction.

* * * * *